United States Patent
Verma et al.

(10) Patent No.: US 10,659,467 B1
(45) Date of Patent: *May 19, 2020

(54) DISTRIBUTED STORAGE AND DISTRIBUTED PROCESSING QUERY STATEMENT RECONSTRUCTION IN ACCORDANCE WITH A POLICY

(71) Applicant: BlueTalon, Inc., Redwood City, CA (US)

(72) Inventors: Pratik Verma, Hopkins, MN (US); Rakesh Khanduja, Hopkins, MN (US)

(73) Assignee: BlueTalon, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/181,789

(22) Filed: Nov. 6, 2018

Related U.S. Application Data (63) Continuation of application No. 14/967,064, filed on Dec. 11, 2015, now Pat. No. 10,129,256.

(60) Provisional application No. 62/101,341, filed on Jan. 8, 2015.

(51) Int. Cl.
| | |
|---|---|
| *H04L 29/06* | (2006.01) |
| *G06F 21/62* | (2013.01) |
| *G06F 17/27* | (2006.01) |
| *G06F 16/25* | (2019.01) |
| *G06F 16/245* | (2019.01) |
| *G06F 16/28* | (2019.01) |

(52) U.S. Cl.
CPC ............ *H04L 63/10* (2013.01); *G06F 16/245* (2019.01); *G06F 16/25* (2019.01); *G06F 16/285* (2019.01); *G06F 17/277* (2013.01); *G06F 21/6227* (2013.01); *G06F 21/6218* (2013.01); *G06F 2221/2141* (2013.01); *H04L 63/20* (2013.01)

(58) Field of Classification Search
CPC ....... H04L 63/10; H04L 63/20; G06F 16/285; G06F 16/245; G06F 16/25; G06F 17/277; G06F 21/6227; G06F 21/6218; G06F 2221/2141

See application file for complete search history.

(56) References Cited

U.S. PATENT DOCUMENTS

| | | | |
|---|---|---|---|
| 6,539,425 B1 * | 3/2003 | Stevens | H04L 41/0893 709/220 |
| 7,577,834 B1 * | 8/2009 | Traversat | G06F 9/547 713/156 |

(Continued)

OTHER PUBLICATIONS

"Final Office Action Issued in U.S. Appl. No. 14/980,525", dated Jan. 7, 2019, 19 Pages.

*Primary Examiner* — Khoi V Le (74) *Attorney, Agent, or Firm* — Fiala & Weaver P.L.L.C.

(57) ABSTRACT

A non-transitory computer readable storage medium has instructions executed by a processor to receive a query statement. The query statement is one of many distributed storage and distributed processing query statements with unique data access methods. Token components are formed from the query statement. The token components are categorized as data components or logic components. Modified token components are formed from the token components in accordance with a policy. The query statement is reconstructed with the modified token components and original computational logic and control logic associated with the query statement.

20 Claims, 9 Drawing Sheets

(56) References Cited

U.S. PATENT DOCUMENTS

| | | | |
|---|---|---|---|
| 2002/0031230 A1* | 3/2002 | Sweet | H04L 63/0428 380/278 |
| 2009/0193493 A1* | 7/2009 | Becker | G06F 21/552 726/1 |
| 2012/0022928 A1 | 1/2012 | Wu | |
| 2013/0173578 A1 | 7/2013 | Epstein | |
| 2014/0317226 A1* | 10/2014 | Resch | G06F 11/1076 709/216 |
| 2016/0065436 A1 | 3/2016 | Disciascio et al. | |

* cited by examiner

Fig 4 (Flow chart A.1)

| resource | access | filter | mask |
|---|---|---|---|
| 1.1.1.* | 1 (allow) | 1.1.1.2 in ('bob') | |
| 1.1.2.3 | 0 (deny) | | |

Fig 6.

| table name | column | identified in sequence database (D.S.T.C) |
|---|---|---|
| emp | employeeid | 1.1.1.1 |
| | firstname | 1.1.1.2 |
| payroll | employeeid | 1.1.2.1 |
| | salary | 1.1.2.3 |

Fig 7.

| # | token | Token Flag | Token Flag Category | Schema SeqNo | Query Level Flag | Query Part Flag | Query SeqID | Query Number | Start Query Flag | End Query Flag | Added Token Flag | OnPart Flag |
|---|---|---|---|---|---|---|---|---|---|---|---|---|
| 1 | select | keyword | | | 0 | 1 | 0 | 0 | 0 | 0 | 0 | 0 |
| 2 | | special character | | | 0 | 1 | 0 | 0 | 0 | 0 | 0 | 0 |
| 3 | a | alias | | | 0 | 1 | 0 | 0 | 0 | 0 | 0 | 0 |
| 4 | | special character | | | 0 | 1 | 0 | 0 | 0 | 0 | 0 | 0 |
| 5 | employeeid | schema element | column | 1 | 0 | 1 | 0 | 0 | 0 | 0 | 0 | 0 |
| 6 | | special character | | | 0 | 1 | 0 | 0 | 0 | 0 | 0 | 0 |
| 7 | a | alias | | | 0 | 1 | 0 | 0 | 0 | 0 | 0 | 0 |
| 8 | | special character | | | 0 | 1 | 0 | 0 | 0 | 0 | 0 | 0 |
| 9 | firstname | schema element | column | 2 | 0 | 1 | 0 | 0 | 0 | 0 | 0 | 0 |
| 10 | | special character | | | 0 | 1 | 0 | 0 | 0 | 0 | 0 | 0 |
| 11 | b | alias | | | 0 | 1 | 0 | 0 | 0 | 0 | 0 | 0 |
| 12 | | special character | | | 0 | 1 | 0 | 0 | 0 | 0 | 0 | 0 |
| 13 | salary | schema element | column | 3 | 0 | 1 | 0 | 0 | 0 | 0 | 0 | 0 |
| 14 | | special character | | | 0 | 1 | 0 | 0 | 0 | 0 | 0 | 0 |
| 15 | as | keyword | | | 0 | 1 | 0 | 0 | 0 | 0 | 0 | 0 |
| 16 | | special character | | | 0 | 1 | 0 | 0 | 0 | 0 | 0 | 0 |
| 17 | total_income | alias | | | 0 | 1 | 0 | 0 | 0 | 0 | 0 | 0 |
| 18 | | special character | | | 0 | 2 | 0 | 0 | 0 | 0 | 0 | 0 |
| 19 | from | keyword | | | 0 | | 0 | 0 | 0 | 0 | 0 | 0 |

| # | Token | Type | Category | Val | | | | | | | | | | | | | | | |
|---|---|---|---|---|---|---|---|---|---|---|---|---|---|---|---|---|---|---|---|
| 20 | | special character | | 0 | | | | 0 | 0 | 0 | 0 | 0 | 0 | 0 | 0 | 0 | 0 | 0 | 0 |
| 21 | emp | schema element | | 0 | 1 | | | 0 | 0 | 0 | 2 | 0 | 0 | 0 | 0 | 0 | 0 | 0 | 0 |
| 22 | | special character | table | | | 0 | | 0 | 0 | 0 | 2 | 0 | 0 | 0 | 0 | 0 | 0 | 0 | 0 |
| 23 | a | special character | alias | 0 | | | | 0 | 0 | 0 | 2 | 0 | 0 | 0 | 0 | 0 | 0 | 0 | 0 |
| 24 | | | | 0 | | | | 0 | 0 | 0 | 2 | 0 | 0 | 0 | 0 | 0 | 0 | 0 | 0 |
| 25 | payroll | schema element | table | | 2 | | | 0 | 0 | 0 | 2 | 0 | 0 | 0 | 0 | 0 | 0 | 0 | 0 |
| 26 | | special character | | 0 | | 0 | | 0 | 0 | 0 | 2 | 0 | 0 | 0 | 0 | 0 | 0 | 0 | 0 |
| 27 | b | special character | alias | 0 | | | | 0 | 0 | 0 | 2 | 0 | 0 | 0 | 0 | 0 | 0 | 0 | 0 |
| 28 | | | | 0 | | | | 0 | 0 | 0 | 2 | 0 | 0 | 0 | 0 | 0 | 0 | 0 | 0 |
| 29 | where | keyword | | 0 | | | | 0 | 0 | 0 | 3 | 0 | 0 | 0 | 0 | 0 | 0 | 0 | 0 |
| 30 | | special character | | 0 | | | | 0 | 0 | 0 | 3 | 0 | 0 | 0 | 0 | 0 | 0 | 0 | 0 |
| 31 | a | special character | alias | 0 | | | | 0 | 0 | | 3 | 0 | 0 | 0 | 0 | 0 | 0 | 0 | 0 |
| 32 | | | | 0 | | | | 0 | 0 | | 3 | 0 | 0 | 0 | 0 | 0 | 0 | 0 | 0 |
| 33 | employeeid | schema element | column | | 1 | | | 0 | 0 | | 3 | 0 | 0 | 0 | 0 | 0 | 0 | 0 | 0 |
| 34 | = | special character | | 0 | | | | 0 | 0 | | 3 | 0 | 0 | 0 | 0 | 0 | 0 | 0 | 0 |
| 35 | b | special character | alias | 0 | | | | 0 | 0 | | 3 | 0 | 0 | 0 | 0 | 0 | 0 | 0 | 0 |
| 36 | | | | 0 | | | | 0 | 0 | | 3 | 0 | 0 | 0 | 0 | 0 | 0 | 0 | 0 |
| 37 | employeeid | schema element | column | | 1 | | | 0 | 0 | | 3 | 0 | 0 | 0 | 0 | 0 | 0 | 0 | 0 |
| 38 | | special character | | 0 | | | | 0 | 0 | | 3 | 0 | 0 | 0 | 0 | 0 | 0 | 0 | 0 |

```
select a
select a.
select a.FIRSTNAME
select a.FIRSTNAME,
select a.FIRSTNAME, a
select a.FIRSTNAME, a.
select a.FIRSTNAME, a.EMPLOYEEID
select a.FIRSTNAME, a.EMPLOYEEID,
select a.FIRSTNAME, a.EMPLOYEEID, 0
select a.FIRSTNAME, a.EMPLOYEEID, 0 as
select a.FIRSTNAME, a.EMPLOYEEID, 0 as total_income
select a.FIRSTNAME, a.EMPLOYEEID, 0 as total_income from
select a.FIRSTNAME, a.EMPLOYEEID, 0 as total_income from emp
select a.FIRSTNAME, a.EMPLOYEEID, 0 as total_income from emp a
select a.FIRSTNAME, a.EMPLOYEEID, 0 as total_income from emp a,
select a.FIRSTNAME, a.EMPLOYEEID, 0 as total_income from emp a, payroll
select a.FIRSTNAME, a.EMPLOYEEID, 0 as total_income from emp a, payroll b
select a.FIRSTNAME, a.EMPLOYEEID, 0 as total_income from emp a, payroll b where
select a.FIRSTNAME, a.EMPLOYEEID, 0 as total_income from emp a, payroll b where (
select a.FIRSTNAME, a.EMPLOYEEID, 0 as total_income from emp a, payroll b where ( a
select a.FIRSTNAME, a.EMPLOYEEID, 0 as total_income from emp a, payroll b where ( a.
select a.FIRSTNAME, a.EMPLOYEEID, 0 as total_income from emp a, payroll b where ( a.employeeid
select a.FIRSTNAME, a.EMPLOYEEID, 0 as total_income from emp a, payroll b where ( a.employeeid =
select a.FIRSTNAME, a.EMPLOYEEID, 0 as total_income from emp a, payroll b where ( a.employeeid = b
select a.FIRSTNAME, a.EMPLOYEEID, 0 as total_income from emp a, payroll b where ( a.employeeid = b.
select a.FIRSTNAME, a.EMPLOYEEID, 0 as total_income from emp a, payroll b where ( a.employeeid = b.employeeid
select a.FIRSTNAME, a.EMPLOYEEID, 0 as total_income from emp a, payroll b where ( a.employeeid = b.employeeid )
select a.FIRSTNAME, a.EMPLOYEEID, 0 as total_income from emp a, payroll b where ( a.employeeid = b.employeeid ) AND
select a.FIRSTNAME, a.EMPLOYEEID, 0 as total_income from emp a, payroll b where ( a.employeeid = b.employeeid ) AND (a.FIRSTNAME in ('bob')
select a.FIRSTNAME, a.EMPLOYEEID, 0 as total_income from emp a, payroll b where ( a.employeeid = b.employeeid ) AND (a.FIRSTNAME in ('bob'))
```

Fig. 9

DISTRIBUTED STORAGE AND DISTRIBUTED PROCESSING QUERY STATEMENT RECONSTRUCTION IN ACCORDANCE WITH A POLICY

CROSS-REFERENCE TO RELATED APPLICATION

This application is a Continuation of U.S. patent application Ser. No. 14/967,064 filed Dec. 11, 2015, which claims priority to U.S. Provisional Patent Application Ser. No. 62/101,341, filed Jan. 8, 2015, the contents of which are incorporated herein by reference.

FIELD OF THE INVENTION

This invention relates generally to data processing in a network. More particularly, this invention is directed toward distributed storage and distributed processing query statement reconstruction in accordance with a policy.

BACKGROUND OF THE INVENTION

Query statements can be formed to obtain data from distributed storage and distributed processing resources. The distributed storage may be a distributed database or a distributed file system. Apache Hadoop is an open-source software framework for distributed storage and distributed processing of very large data sets on computer clusters built from commodity hardware.

The core of Apache Hadoop® consists of a storage part (Hadoop Distributed File System (HDFS)) and a processing part (MapReduce®). Hadoop splits files into large blocks and distributes them amongst the nodes in the cluster. To process the data, Hadoop MapReduce transfers packaged code for nodes to process in parallel, based on the data each node needs to process. This approach takes advantage of data locality (nodes manipulating the data that they have) to allow the data to be processed faster and more efficiently than it would be in a more conventional supercomputer architecture that relies on a parallel file system where computation and data are connected via high-speed networking.

The Hadoop ecosystem has a variety of access methods. Apache Hive® is a data warehouse infrastructure built on top of Hadoop for data summarization, query and analysis. Apache Spark® is an open source cluster computing framework that allows user programs to load data into a cluster's memory and query it repeatedly. Solr® is an open source enterprise search platform that enables full-text search, hit highlighting, faceted search real-time indexing, dynamic clustering, database integration, NoSQL features and rich document handling.

Each access method has a query language associated with it to specify what data should be returned by the server and what operations should be done with the data. These data access query languages typically behave like set theory operations, which are neither purely object-oriented nor purely procedural. Therefore, they are not easily broken down into components that can be re-engineered.

Therefore, it would be desirable to identify techniques to parse queries associated with different access methods. Further, it would be desirable to provide techniques for reconstructing queries associated with different access methods to enforce a policy.

SUMMARY OF THE INVENTION

A non-transitory computer readable storage medium has instructions executed by a processor to receive a query statement. The query statement is one of many distributed storage and distributed processing query statements with unique data access methods. Token components are formed from the query statement. The token components are categorized as data components or logic components. Modified token components are formed from the token components in accordance with a policy. The query statement is reconstructed with the modified token components and original computational logic and control logic associated with the query statement.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
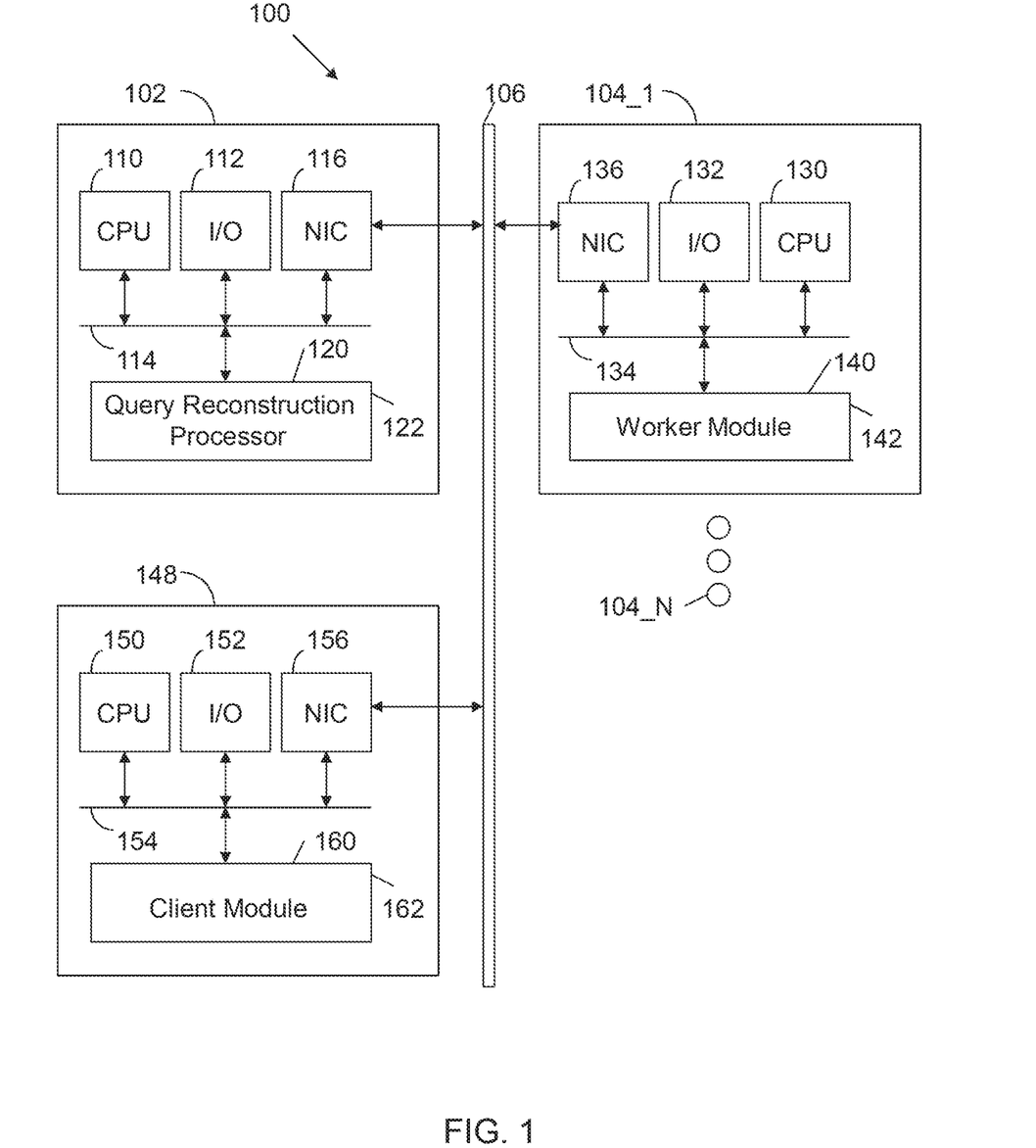
FIG. 1 illustrates a network configured in accordance with an embodiment of the invention

FIG. 1 illustrates a network 100 configured in accordance with an embodiment of the invention. The network 100 includes a server 102 connected to a set of servers 104_1 through 104_N a network 106. The server 102 can be a master server, while servers 104_1 through 104_N are worker servers in a distributed storage and a distributed processing environment. Network 106 may be any combination of wired and wireless networks.

Server 102 includes standard components, such as a central processing unit 110 connected to input/output devices 112 via a bus 114. The input/output devices 112 may include a keyboard, mouse, touch display and the like. A network interface circuit 116 is also connected to the bus 114 to provide connectivity to network 106. A memory 120 is also connected to the bus 114. The memory stores instructions executed by the central processing unit 110 to implement operations of the invention. In particular, the memory 120 stores a query reconstruction processor 122 to implement operations disclosed herein.

Each worker server 104_1 through 104_N also includes standard components, such as a central processing unit 130, bus 134, input/output devices 132 and a network interface circuit 136. A memory 140 is connected to bus 132. The memory 140 stores a worker module 142 to implement distributed storage and distributed processing operations.

The network 100 may also include a client machine 148. The client machine 148 includes standard components, such as a central processing unit 150, input/output devices 152, a bus 154 and a network interface circuit 156. A memory 160 is connected to bus 154. The memory 160 stores a client module 162 with instructions executed by the central processing unit 150. The client module 162 may facilitate the formation of a query, which is then directed toward the query reconstruction processor 122 of master server 102.

Figure 2:
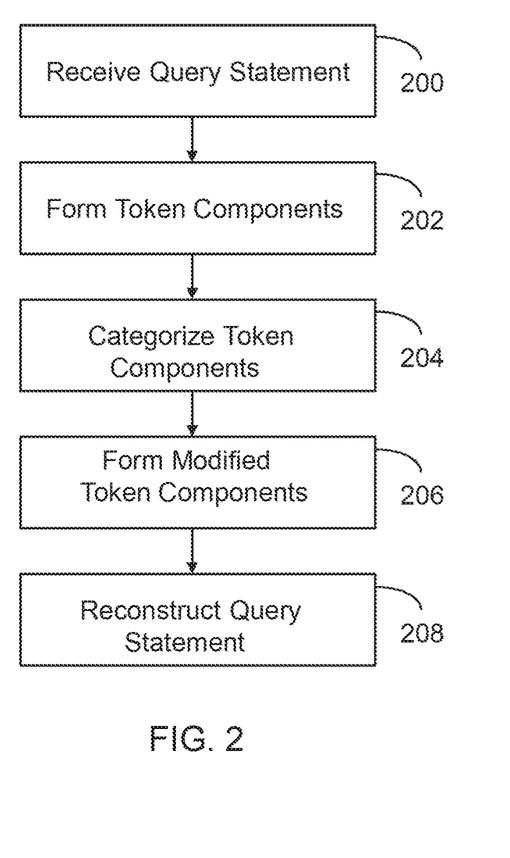
FIG. 2 illustrates processing operations associated with an embodiment of the invention.

FIG. 2 illustrates processing operations associated with an embodiment of the query reconstruction processor 122. Initially, a query statement is received 200. The query statement is one of a plurality of distributed storage and distributed processing query statements with unique data access methods. Token components are then formed from the query statement 202. The token components are then categorized 204. A typical data analysis query language statement, command, or program, contains one of three separate components: data elements, computational logic and control logic. Categorization of token components includes categorizing the tokens as belonging to each of the three different components.

Modified token components are then formed 206. Finally, the query statement is reconstructed. That is, the query reconstruction processor 122 determines how the tokens belonging to the data elements need to be translated or modified to comply with a policy, and reconstructs the statement with the modified data elements without affecting the computational or the control logic. The policy may relate to access control, query language dialect conversion and/or on the fly query optimization.

The query reconstruction processor 122 may include a lexical algorithm, a translation algorithm and execution algorithms that include order by, group by, unique alias, aggregation function, where part merging, meta table join, elimination, redaction and replacement operation algorithms.

The lexical algorithm performs lexical operations on the input query statement to tokenize the statement and mark the resulting tokens against a particular query language's grammar to classify the tokens appropriately as data or logic. This involves breaking down a statement into 'words' and keeping track of the 'words' in a data structure that includes the name, the class and other information such as types, size, etc. By comparing the tokens against the policy grammar, the 'words' are marked as one of the following: database specific tokens, special characters, language keywords, comments, values, file paths, URIs, aliases and functions. In addition, the statements are marked for start and stop of sections based on the tokens identified, for example start and end of JOIN and ON parts of a HiveQL® statement. In addition, the scope for which a class of the 'words' is applicable is also identified and marked, for example to distinguish between aliases that are column aliases, table aliases or sub-query aliases. The translation algorithm then compares the token identified as data elements against a set of data elements, concepts, schemas, etc. known to the system to translate or determine the action to take. A star token may be expanded into the component fields explicitly so that the different fields can be modified individually. Based on the translation, the policy engine cycles through different execution algorithms to create a modified policy compliant request.

Figure 3:
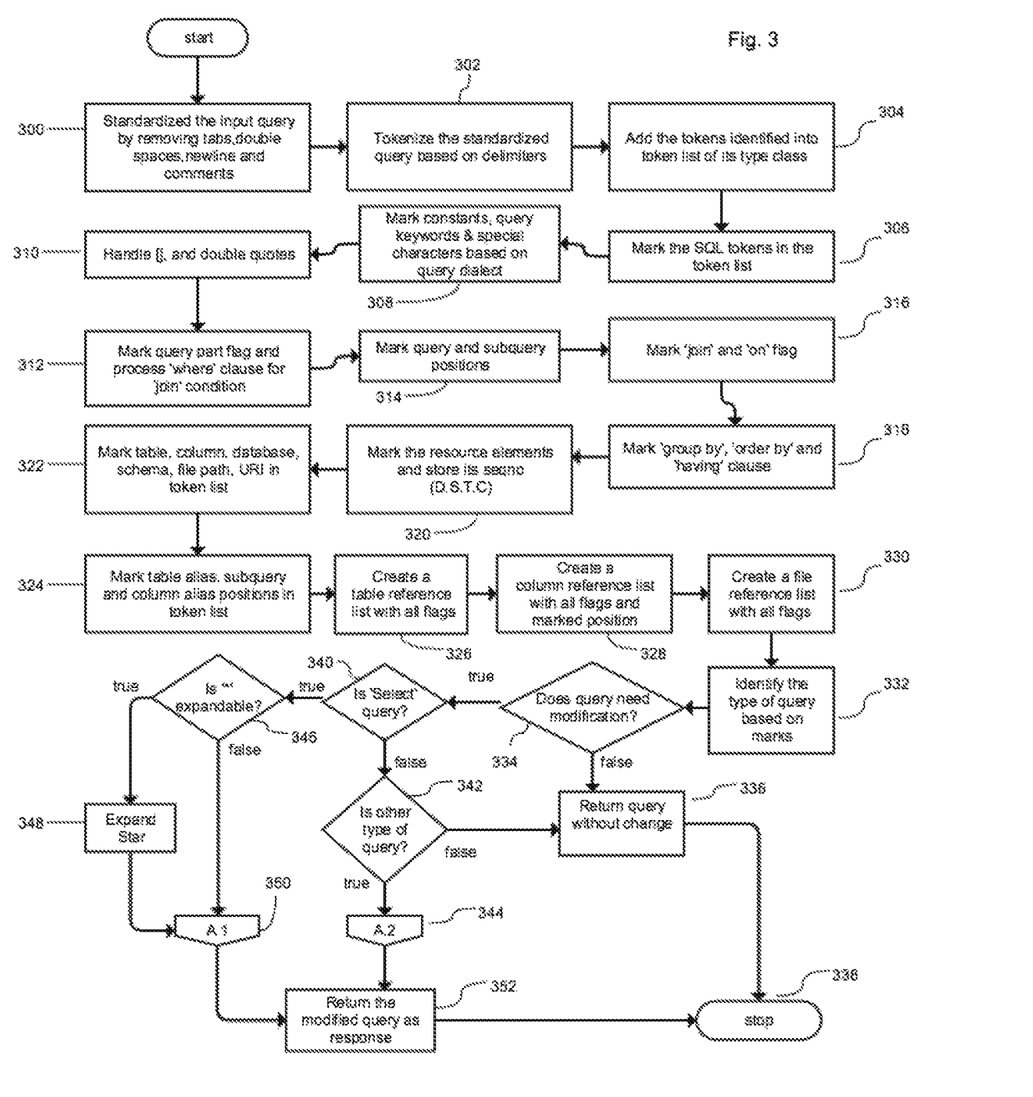
FIGS. 3, 4 and 5 illustrate processing operations associated with an embodiment of the query reconstruction processor 122.

FIG. 3 illustrates more detailed operations associated with an embodiment of the query reconstruction processor 122. Initially, the query is standardized 300. For example, the query may be standardized by removing tabs, double spaces, and comments. The query is then tokenized 302. For example, the tokens may be formed by delimiters such as commas, semicolons, '\' etc. The list of the tokens is then classified into specific class types 304 based on how the token should be processed in the rest of the workflow. In the next 10 steps (306-324), various parts of the original query are marked so that it can be processed based on the markings in subsequent steps. The tokens of the type SQL tokens in the token list are then marked 306. Constants, keywords and special characters are then marked 308. Special characters, such as double quotes, are handled 310. A query part flag is marked and each 'where' clause is processed for a 'join' condition 312. Query and subquery positions are marked 314. 'Join' and 'on' flag elements are marked 316. 'Group by', 'order by' and 'having' clauses are marked 318. Resource elements are marked 320. They are then stored with sequence numbers computed for easy computation and in-memory creation of rules lists in steps 326, 328 and 330. Table, column, database, schema, file paths and URIs are then marked in the token list 322. Table alias, subquery and column alias positions are then marked in the token list 324. A table reference list with all flags is then created 326. A column reference list with all flags is then created 328. A file path reference lists with all flags is then created 330. The primary type of the query is identified 332. It is then determined whether the query needs to be modified 334. If query modification is not needed (334—false), the query is not changed 336. Query reconstruction is then terminated 338.

If the query needs modification (334—true), it is determined whether the query is a 'select' type query 340. If the query is not a select query (340—false), it is determined whether it is another form of query 342. If so (342—true) processing proceeds to A2 344 of FIG. 5. If the query is not of the type 'select' or a type recognized (342—false), then no change is required 336 and query reconstruction processing is terminated 338.

Returning to block 340, if the query is a select query (340—true), it is determined whether the query is expandable 346. If so (346—true), the star schema is expanded 348 and processing proceeds to A1 350 of FIG. 4. The process of expansion of the '*' replaces the token '*' with the comma delimited list of tokens for columns that the table contains based on the information about the table available at the time of the query processing. After the processing at A2 344, the query response is obtained 352 and processing terminates 338. After the processing of A1 350, the modified query is obtained 352 and executed.

Figure 4:
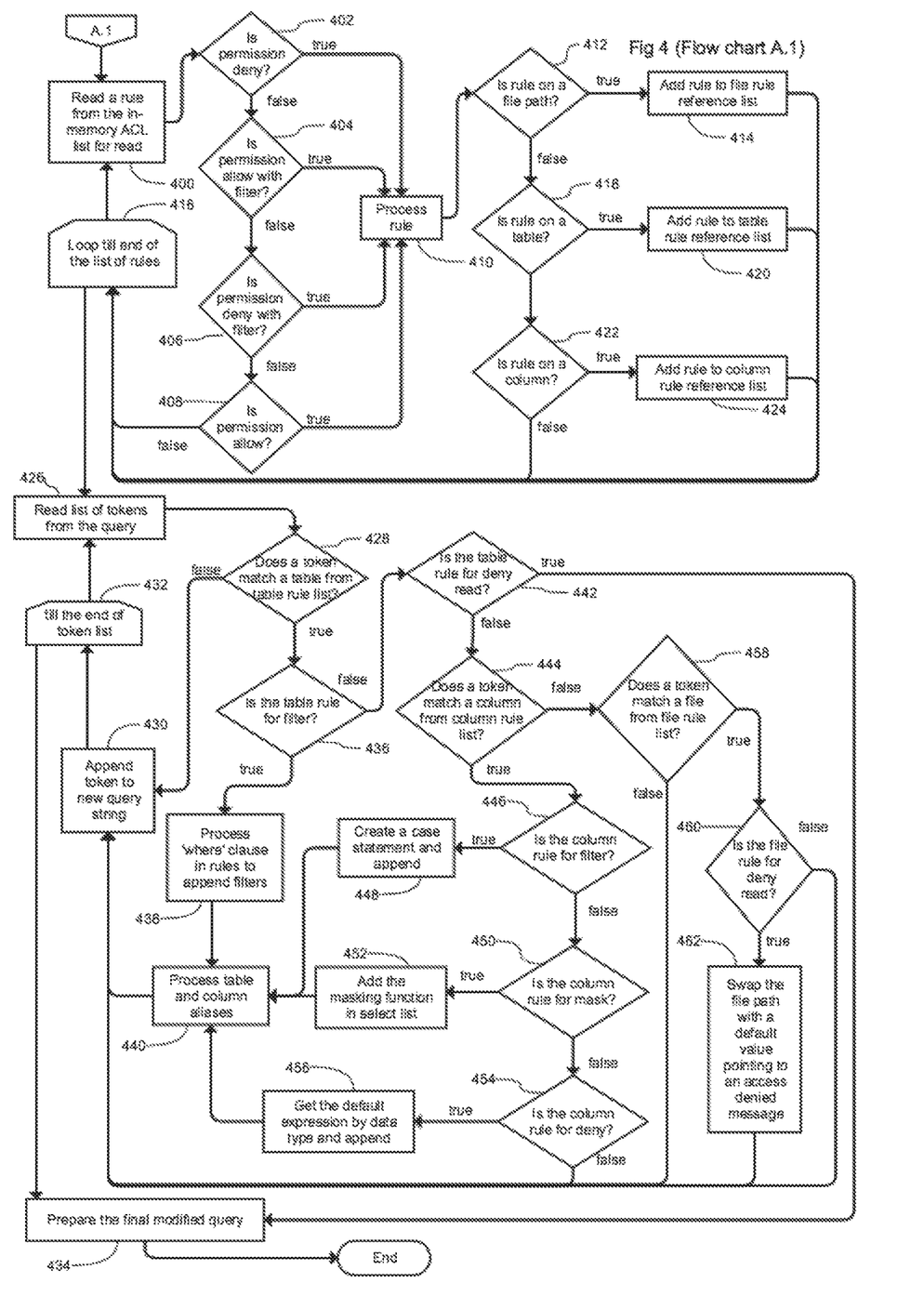

Turning to FIG. 4 A.1 processing 350 begins by reading a rule from a list of access control rules 400 to operate on the select query with '*' expansion and marking done from previous steps. In this example, the rules relate to a data access policy. In this example, there are four types of permissions tested at decision blocks 402, 404, 406 and 408. If the rule if of type 'deny' (402—true) permission is denied and the rule is processed in block 410. If the rule is a deny on a file path (412—true), then the file rule reference list is updated to include the given rule in block 414. After the file rule reference list is updated, the processing loops to block 416, which tests whether the entire rules list has been processed. If there is still an entry in the list, processing returns to block 400. If the entire list has been processed, the modified query is constructed starting with the reading of the query tokens from the query token list in block 426. If the rule is not a deny on a file path (412—false) but on a table instead (418—true), then the table rule reference list is updated and processing loops to block 416. If the rule is not on a file path (412—false) or a table (418—false) but instead on a column, then the column rule reference list is updated and processing loops to block 416. If the deny rule is not applicable to file, table or column, then no changes to any rule reference lists are made and the processing loops to block 416 to iterate over the next rule in the rules list. Similar processing is performed in the case of allow with filter 404, deny with filter 406 and allow 408 permissions on file, table or column. In case a given rule doesn't match any of the deny (402—false), allow with filter (404—false), deny with filter (406—false), or allow types (408—false), the processing skips to the next rule in the rules list without changes to any of the file, table or column rule reference lists.

After all the rules in the access control lists are iterated over, from block 416 processing proceeds to block 426. A token is read from the query token list 426. The token is compared with the table rule reference list and if a match is not found (428—false), the selected token is appended to the query string without modification 430. The processing continues through blocks 432 and 426 for the next token until the last token of the query string is processed, the final modified query is prepared 434 and the processing returns to block 352 of FIG. 3.

If a match is found between a token in the query string with a table from the table rule reference list (428—true) and the rule for that table contains a filter (436—true), a new 'where' clause is constructed in accordance with the filter rule specified to modify the token 438. Any aliases associated with the table or the column names are discovered and processed 440 before the modified token with filters and alias is appended to query string 430 and the processing continues through to the end of the original query string (432 and 426). In case the table rule matched in 428 is not a filter rule (436—false) but instead a 'deny all read' type (442—true), the processing skips to the preparation of the modified query that reflects the table level deny rule in block 434, before returning to block 352 of FIG. 3.

Consider the case where a match for a table is found (434—true), but a filter rule is not found (436—false) and a deny rule is not found (442—false). In this case, a match is sought for a column rule in the reference list 444. If a match does exist (444—true), column filter rules are evaluated 446. If a rule exists (446—true), a case statement is created and appended 448. Aliases are then handled 440 and control returns to block 430. If column filter rules do not exist (446—false), a column mask rule 450 is tested. If such a rule exists (450—true) a masking function is added 452. If a column mask rule does not exist (450—false), a column denial rule is checked 454. If a column denial rule exists (454—true), a default expression by data type is accessed and appended 456. Aliases are then handled 440 and control returns to block 430. When the token list is finally processed, the final query is prepared and buffered 434. Control then returns to block 352 of FIG. 3.

If a match sought for a column rule in the reference list 444 does not exist (444—false), a match is sought for a file path rule in the reference list 458. If a match for the file path does exist (460—true), the file path is modified to a default value reflecting the deny permission, otherwise (460—false) no change to file path is processed. Control then returns to block 430. When the token list is finally processed, the final query is prepared and buffered 434. Control then returns to block 352 of FIG. 3.

Figure 5:
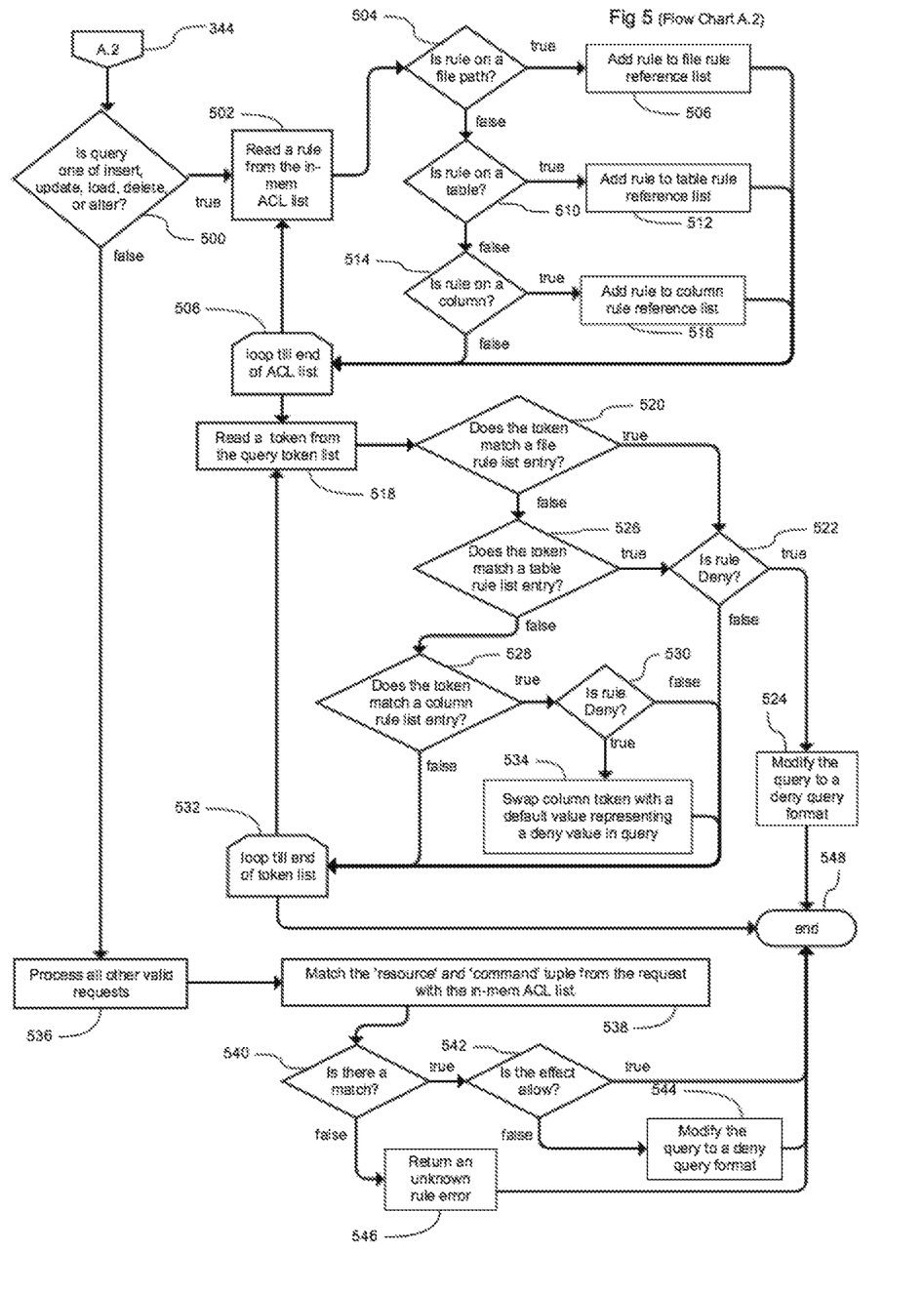

FIG. 5 illustrates processing associated with A2 of block 344. Initially, the query is checked for insert, load, update, delete or alter commands 500. If such a command exists (500—true) a rule is read from the subset of the access control list associated with such commands 502 and matched with the resource of type file path, table or column. If the rule is on a file path (504—true), then the file rule reference list is updated to include the given rule 506. After the file rule reference list is updated, the processing loops to block 508, which tests whether the entire rules list has been processed. If there is still an entry in the list, processing returns to block 502. If the entire list has been processed, the modified query is constructed starting with the reading of the query tokens from the query token list in block 518. If the rule is not on a file path (504—false), but is on a table instead (510—true), then the table rule reference list is updated and processing loops to block 508. If the rule is not on a file path (504—false) or a table (510—false) but is instead on a column, then the column rule reference list is updated 516 and processing loops to block 508. If the rule is not applicable to file, table or column, then no changes to any rule reference lists are made and the processing loops to block 508 to iterate over the next rule in the rules list.

When the end list check of block 508 is reached, control proceeds to block 518 where a token is read from the token list. An attempt is made to match the token to a file path reference list 520. If a match is not found (520—false), an attempt is made to match the token to a table reference list 526. If a match is found for a file path (520—true) or a table (526—true) a denial check is made 522. If denial is not necessary (522—false) a loop check for the end of the access control list is made 532 and control returns to block 518 if the end is not reached. If there is a file path denial or a table denial (522—true) a deny response is fetched 524 and an end state 530 is reached. Consider the case where a match for the file path (520—false) and table is not found (526—false), an attempt is made to match the token to a column 528. If the token matches the column reference list (528—true) a column denial check is made 530. If there is a column denial (534—true), the column token is swapped with a default pre-defined value representing a deny in block 534, before a loop check for the end of the access control list is made 532 and control returns to block 518 if the end is not reached. If a denial rule is not necessary (530—false), the column token is left unmodified and the control returns to block 532.

Returning to block 500 of FIG. 5, if the query does not have the specified elements (500—false), the query is processed for other valid commands 536. An attempt is made in block 538 to match a tuple of 'resource' and 'command' from the query with tuples in the subset of the access control list associated with the query types already processed in block 340 of FIG. 3 and block 500 of FIG. 5. In block 540 it is determined whether a match is found. If a match exists (540—true) an allow permission is tested 542. If allow is applicable (542—true), the query is forwarded unmodified and processing is completed 548. If allow is not applicable (542—false), the query is modified to conform with a deny format and processing is completed 548. If a match to a valid resource or commands is not found (540—false), the query is modified to conform with an error message associated with 'not available' response 546 and the processing is completed 548.

Figure 6:
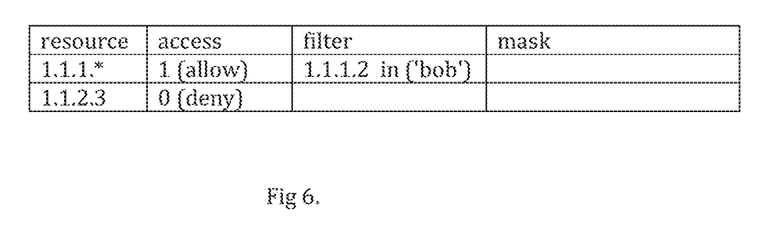
FIG. 6 illustrates an access control table processed in accordance with an embodiment of the invention.
Figure 7:
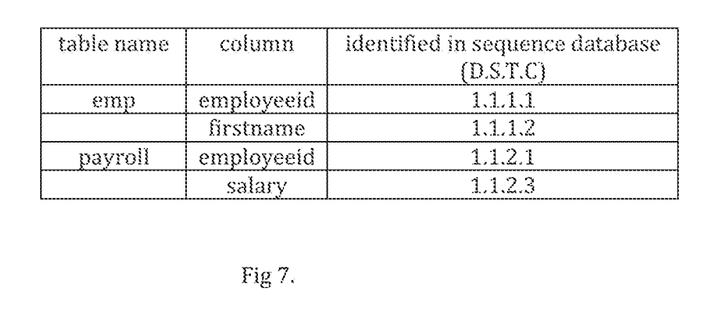
FIG. 7 is a data table processed in accordance with an embodiment of the invention.
Figure 8A:
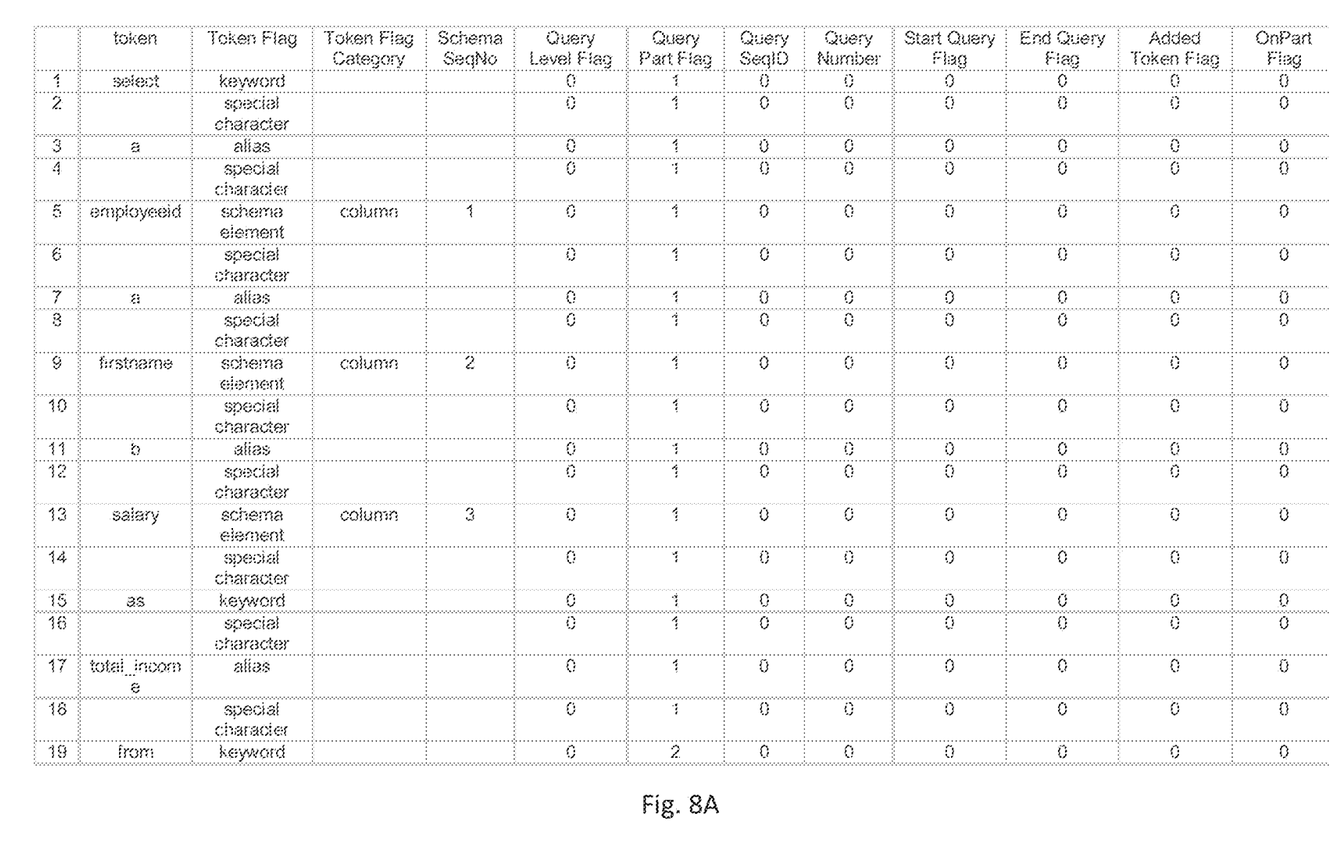
FIGS. 8A and 8B illustrate token characterization of tokens of an exemplary query statement.
Figure 8B:
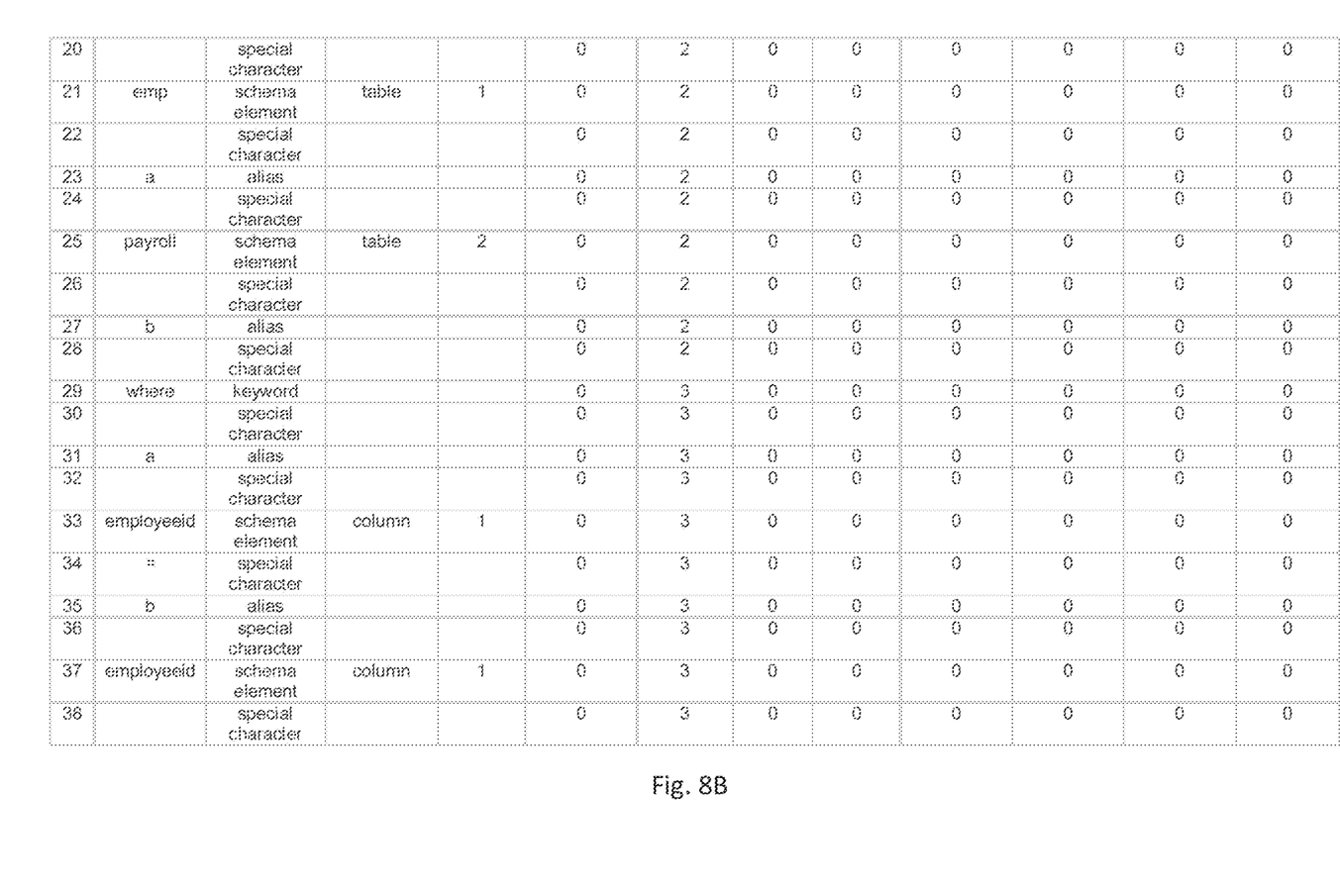

The foregoing is more fully appreciated in connection with a specific example. Consider the case of a user "bob" and an access control list of with a filter field (filter: first_name='<userid>') and a deny command (deny: salary). FIG. 6 illustrates an access control table with a resource column, an access permission column and a filter column. Now consider the data table of FIG. 7, which includes a table name column, a column name column and a resource column. Now consider the following SQL statement: select a.*.b.salary as total_income from emp a, payroll b where a.employeeid=b.employeeid. The processing of FIG. 3 results in the table spanning FIG. 8A and FIG. 8B. The table includes a token column. The token column has individual words or tokens of the query. A token flag column characterizes the nature of the token (e.g., keyword, special character, alias, schema element, etc.). A token flag category characters a token as a column or table token. A schema sequence number column ascribes numeric values to keywords. The remaining columns relate to flag values, including query level flag, query part flag, query sequence ID, query number, start query flag, end query flag, added token flag and onpart flag.

Figure 9:
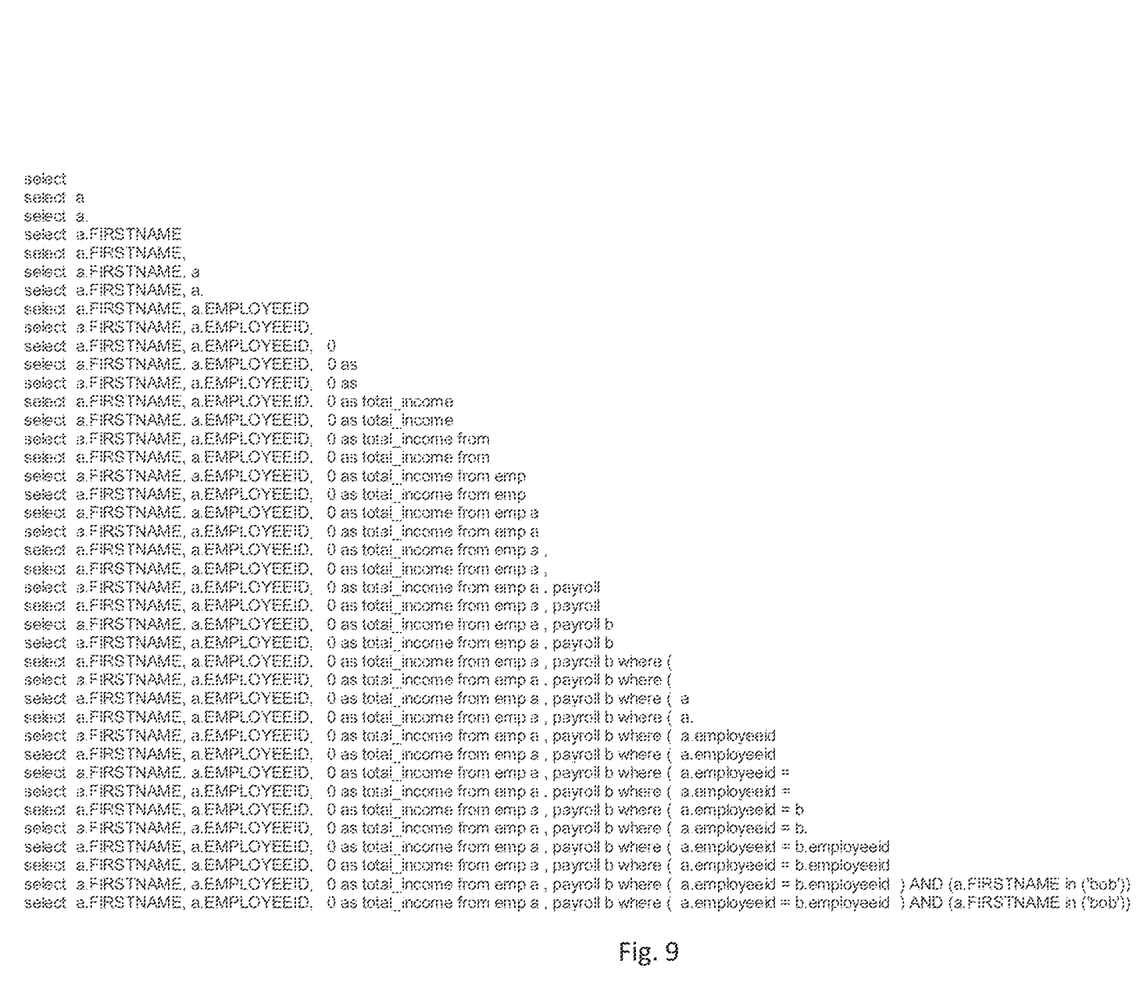
FIG. 9 illustrates the sequential reconstruction of the exemplary query statement in accordance with an embodiment of the invention.

Since a select query is involved, the processing of FIG. 4 is invoked to sequentially construct a modified query as incrementally shown in FIG. 9. The final query is select a.FIRSTNAME, a.EMPLOYEEID, 0 as total_income from emp a, payroll b where (a.employeeid=b.employeeid) and (a.FIRSTNAME in ('bob')).

The following discussion relates to implementation details associated with various embodiments of the invention. Any query language processed is standardized by replacing the multiple spaces, tabs, new lines and enter characters with the single space character. Comments are removed. The input statement is tokenized using a delimiter set. That is, a token is searched is a database keywords list. If the token is found in the list, then the token is added in the token list with its specific type and sub type set. The token is checked if its a constant (integer/float). Then the token is added according to its type in the token list. For the keywords which are not found in the keyword list and in a constants list, the token is added in the token list as an invalid or other token (e.g., OTHERTOKEN). If the token to be added is a special character, then the token is checked for different special characters and added in the token list according to the type of the token. If the token is "*" then the given token is checked for a column element or part of an expression and then the given "*" token is added in the token list along with appropriate related columns or expressions.

The token is checked to determine if it contains any relational operator then that token is added to the token list with type set as relational operator. A string between single quotes and double quotes is added as a literal to the token list. The quotes and the string between the quotes are considered as a single token and type is set according to the quotes added (SINGQLITERAL/DOUBQLITERAL). The string between the square brackets is added as a single string with the type set as other token (ASOTHERTOKEN). If the token is a space character, then the token is added with type set as SPACEFLAG. The query token array (Indexed Query Token List) is created from the query token list.

SELECT, FROM and WHERE parts are marked for query level, such as main query or subquery. Also marked are the start and end of the MAIN and SUB QUERIES with the help of opening and closing parenthesis. If any inconsistency found in the number of opening and closing parentheses, then an error is reported. With the help of start of SELECT, FROM and WHERE parts the parts of the complete tokens are marked. The SELECT part is marked from the start of the SELECT part up to the start of the FROM part. The FROM part is marked from the start of the FROM part up to the start of the WHERE part. The WHERE part is marked from the start of the WHERE part to the end of the query. If in between the marking of any part a sub query is started, then its marking is done in the same way as the start of SELECT, FROM and WHERE parts.

The start and end JOIN and ON parts are marked in the FROM part of the given statement. The start and end of JOIN and ON parts are marked according to the count of the JOIN and ON keywords in the statement. The start of the JOIN part is marked from the token having the JOIN keyword and end is marked at the token where the ON keyword is found. If before the ON keyword there is WHERE, ORDER and GROUP keyword found then the token previous to that is marked as the end of the JOIN part and the ON part is not present in that case. If the ON part is present for a JOIN condition then its start is from the ON keyword itself and end is on WHERE, ORDER or GROUP keywords or at the start of new JOIN condition.

In marking of schema elements present in the input statement, the invalid tokens and the double quoted string literal tokens are considered. In the case of marking of schema elements first the FROM part of the input statement is processed in order to mark the tables present in the input. After marking of tokens in the FROM part, the schema elements in the query are marked from the inner nested depth to the upper levels. The token present is traversed in the given range and the token is checked for an invalid token or a double quoted string.

The given token is searched in a database sequence tree. If it is not found, then a check is made for a mapping for the given token at the database level. If the token is found as a database element, then the next token after the "." in the Schema Sequence Tree is checked or the mapping at the schema level is checked. Thereafter, checks are made for table and column. If database and schema are marked and the table is not marked, then the process for the database and schema is also reverted. If the token is not for the database element marking, then the schema is searched. A table and a column is treated in the same way.

After marking of the schema elements in the FROM part the table and sub query aliases are marked. It is determined if the token part is marked as a FROM part. For a FROM part there is a check of whether the token is a start of a sub query in the FROM part. If so, then the list is traversed up to the end of the sub query. After the end of the sub query there is a check of whether an alias is defined at the end of the query. If the token in the FROM part is not the start of the sub query then there is a check for the table element in the FROM part. If the token is the table element, then there is a check of whether the token is next to the table element (skipping spaces). An alias is then checked. If an alias for the sub query or the table is found then there is a check of whether the alias name is the unmapped name. If it is the unmapped name, then it is changed to the real name. The given token is then marked a SUBQUERY or TABLE alias. After the marking of the token, the given token is searched in the complete statement and the tokens which are identical to the alias token are also marked as the alias according to the type if they have the "." as the next token (skipping the spaces in between).

After marking of the schema elements, column aliases are marked. The statement is traversed. It is determined whether the token belongs to the SELECT part. It is determined if the token is a double quoted string and the previous token is a column element (skipping the spaces in between). Then the given token is marked as column alias. If the token is an "AS" keyword, then the next token is marked as a column alias. If the type of token is such that the token can be marked as a column alias, then the previous and next tokens of the given token are checked. If the next token of the given token is the "," of the SELECT part or the FROM keyword, then the token can be marked as an alias if the previous token satisfies the condition. If the token previous to the given token is a column element, end of the sub query, "END" keyword itself, single quoted or constant literals, pseudo column or the closing parenthesis ")" then the given token is marked as the column alias. If the alias for the column is found then it is checked whether the alias name is the unmapped name and if it is unmapped name then change to the real name. After the marking of the token the given token is searched in the complete statement and the tokens which are identical to the alias token are also marked as the alias if it does not belong to the same statement and it has no "." in the tokens next to it.

This section describes the star expansion process for the star present in the main query SELECT part. The main query SELECT part is searched for a '*' and if found it is marked as a column element. Before expanding the star, the table reference list for the given statement is generated. The table reference list contains the information about the table and sub queries used in the FROM part of the input statement. It also stores the information about the table referenced in the query. Previous tokens of the star are checked (skipping spaces in between). CASE 1: a star comes with some specification. There may be 3 different specifications. In the case of a table alias there is a search for the table for which the given alias is defined. If the schema information is also given with the table name then, it adds the given information, otherwise it generates the search key with the default schema and database information. For the generated search key for the table it gets all the columns of the given table and adds the given column in the expanded list for the '*'. In the case of a table name the schema information for the table given is fetched in the specification with the '*'. If the schema information is not present with the table, then it generates the search key with the default schema and database specification. For the generated search key for the table it gets all the columns of the given table and adds the given column in the expanded list for the '*'. In the case of a sub query alias, the start and the end of the sub query is found. The alias is added as a specification with the '*'. A SELECT column list for the sub query is generated. The complete SELECT column list for the statement is traversed. If the SELECT column node contains the '*' then the table reference list for that sub query is generated and the star is expanded for the given sub query. The expanded nodes are inserted in the list where columns are added for the expanded star. If the SELECT column node does not contain the '*' then the given node is inserted in the expanded list by checking the alias for the node.

CASE 2: a star comes without any specification. In this case, the start of the table reference list is identified for the given statement. Before processing the particular table reference node, the query separator index for the given node and the query separator index for the '*' are checked. If both are identical, then it is processed. Then the table reference node type is checked. If the type is "TABLE" then the search key for the given table is generated and its column list is obtained. The list of the column with the specification of table is added in the link list generated to be replaced with the column. If the type of the table reference node is "sub query" then, the start and the end of the sub query is obtained and the SELECT column list is generated for the given statement. If the sub query does not have the alias defined for it in the statement, then a unique alias is generated for the given sub query. The complete SELECT column list for the given statement is traversed. If the SELECT column node contains the '*' then the table reference list for that sub query is generated and the star is expanded for the given sub query. The expanded nodes are inserted in the list where columns are added for the expanded star. If the SELECT column node does not contain the '*' then the given node is inserted in the expanded list by checking the alias for the node.

This section describes the algorithm used to find an expression. This algorithm is called once the query tokenization and marking of a query part is completed. Each token of the input statement is checked to determine whether the type of the current token is ASOTHERTOKEN. If the type is not other token then, there is a check of whether the current token is one of the following keywords: FROM, WHERE, ORDER, GROUP, BY, HAVING, AND, OR. If the token is one of the given keywords, then the algorithm updates the last index to the current token index+1. This last index is used to determine the start of the expression. If the type of the current token is marked as the other token, then it loops the token from the last index up to the total token count. While looping, it takes care of the opening and closing parenthesis count and the CASE and END tokens. It breaks the loop when the parenthesis count is zero and there is no open case statement and the current token of the inner loop is something which can be used to end the current expressions for example (",", FROM, WHERE, AND, OR, GROUP, BY, ORDER etc.). While breaking, it marks the previous token as the end of the expression and updates the last index to current index+1 for the next expression. Next, there is a search for the given input expression in the list of the expressions stored in the memory. The search is made by comparing each token of a complete expression list with the token of the current input expressions. If any expression is matched then, there is a search for a map name from the mapping information populated for real to virtual un-mapping. The mapping information returns the name of the virtual column (label). The current input expression information is stored in the back trace list which is used in case of virtual to physical un-mapping after access control. The current input expression is changed to the virtual label with which it is mapped. If the expression is the part of the main query select part, then the main query select part is searched to determine if the alias is defined for the expression or not. If not, then the structure which will be used later to add a column level alias for the expression is updated.

The following describes generation of the back trace list at the time of real to virtual un-mapping, which is used by the virtual to real un-mapping process after access control. This section describes the nodes added in the back trace list for the one to one element mapping. The nodes for the expression based mapping are added at the time when an expression is found in the input and is replaced by the virtual column explained above.

Each token of the input statement is checked to determine whether the map name boolean flag for the current token is set to TRUE. If it is not set to TRUE, then the token is skipped. If the flag is set to TRUE, then memory is allocated for the back trace list node and its data. Back trace node data for the current node is populated. The information stored may include level of the node (Database/Schema/Table/column), type of mapping (one to one), physical element value, virtual element value, part and level of the token in the input statement, and table/column sequence order. If the current token is of type TABLE, then the complete input list is traversed to search if the alias is defined for the given table. If the alias is defined, then that alias information is stored along with the back trace data. After storing the complete information in the back trace node the current node is inserted into the back trace list. This back trace list is used at the time of un-mapping from virtual to physical layer.

The UNMAP method resolves the UNMAP condition. The UNMAP condition contains the virtual elements that need to be resolved with their physical counterparts. The whole input condition is parsed to find the mapping for each element. If the mapping of the column or table is found in the back trace list, then the virtual column or table element is replaced with the token that that is associated with the mapping. There may be three cases: (1) if the case is virtual_table.virtual_column, then UNMAP both the table and column, (2) if the case is alias.virtual_column, then do not change the alias but the column, (3) if the case is virtual_column only, then UNMAP the column. If the mapping is not found in back trace list then there are three cases (1) if the element is a valid physical element do not do anything (keep this element as it is), (2) if the columns table is used in the current statement and if the case is virtual_table.virtual_column and mapping of virtual_column is not found in the back trace list, then first find the physical table and physical column for this virtual column. If this physical table is found in the back trace list, then the table and column are replaced with the tokens associated with the mapping. The third case is if the alias.virtual_column and mapping of virtual_column are not found in the back trace list, then the physical table and physical column for this virtual column is searched for first. If this physical table is found in the back trace list, then the physical table's alias and the physical column are replaced with this mapping. If the case is virtual_column only and mapping of virtual_column is not found in back trace list, then the physical table and physical column for this virtual column are searched for first. If this physical table is found in the back trace list, the physical column is replaced with this mapping.

An embodiment of the present invention relates to a computer storage product with a non-transitory computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media, optical media, magneto-optical media and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A server, comprising:
a network interface circuit connected to a network;
a processor connected to the network interface circuit; and
a memory connected to the processor, the memory storing instructions executed by the processor to:
receive a query statement from a client machine;
form token components from the query statement;
categorize each token component of the token components as one of a data component, a computational logic component or a control logic component;
form modified token components from the token components in accordance with a policy;
reconstruct the query statement with the modified token components and computational logic and control logic associated with the query statement to form a policy compliant query statement; and
coordinate execution of the policy compliant query statement on worker machines connected to the network.

2. The server of claim 1 wherein the policy is an access control policy.

3. The server of claim 1 wherein the policy is a query language dialect conversion policy.

4. The server of claim 1 wherein the policy is a query optimization policy.

5. The server of claim 1, wherein the token components are alternately categorized as database specific tokens, special characters, language keywords, comments, values, aliases, file paths, URIs and functions.

6. The server of claim 1, wherein the token components are formed based on lexical operations performed on the query statement.

7. The server of claim 1, wherein each token component of the token components is categorized by comparing each token component of the token components against a grammar utilized by a query language in which the query statement is formulated.

8. A method, comprising:
receiving a query statement from a client machine;
forming token components from the query statement;
categorizing each token component of the token components as one of a data component, a computational logic component or a control logic component;
forming modified token components from the token components in accordance with a policy;
reconstructing the query statement with the modified token components, computational logic, and control logic associated with the query statement to form a policy compliant query statement; and
coordinating execution of the policy compliant query statement on worker machines connected to a network.

9. The method of claim 8, wherein the policy is an access control policy.

10. The method of claim 8, wherein the policy is a query language dialect conversion policy.

11. The method of claim 8, wherein the policy is a query optimization policy.

12. The method of claim 8, wherein the token components are alternately categorized as database specific tokens, special characters, language keywords, comments, values, aliases, file paths, URIs and functions.

13. The method of claim 8, wherein said forming comprises:

forming token components based on lexical operations performed on the query statement.

14. The method of claim 8, wherein said categorizing comprises:

categorizing each token component of the token components by comparing each token component of the token components against a grammar utilized by a query language in which the query statement is formulated.

15. A computer-readable storage device comprising program instructions that, when executed by at least one processor of a computing device, perform a method, the method comprising:

receiving a query statement from a client machine;
forming token components from the query statement;
categorizing each token component of the token components as one of a data component, a computational logic component or a control logic component;
forming modified token components from the token components in accordance with a policy;
reconstructing the query statement with the modified token components, computational logic, and control logic associated with the query statement to form a policy compliant query statement; and
coordinating execution of the policy compliant query statement on worker machines connected to a network.

16. The computer-readable storage device of claim 15, wherein the policy is an access control policy.

17. The computer-readable storage device of claim 15, wherein the policy is a query language dialect conversion policy.

18. The computer-readable storage device of claim 15, wherein the policy is a query optimization policy.

19. The computer-readable storage device of claim 15, wherein the token components are alternately categorized as database specific tokens, special characters, language keywords, comments, values, aliases, file paths, URIs and functions.

20. The computer-readable storage device of claim 15, wherein said forming comprises:

forming token components based on lexical operations performed on the query statement.

\* \* \* \* \*